(12) United States Patent
Li et al.

(10) Patent No.: US 10,411,750 B2
(45) Date of Patent: Sep. 10, 2019

(54) SMART DEVICE ASSEMBLY AND PROTECTION CASE FOR SMART DEVICE

(71) Applicant: HuiZhou TCL Mobile Communication Co., Ltd., HuiZhou (CN)

(72) Inventors: Jizhong Li, HuiZhou (CN); Chenyang Li, HuiZhou (CN); Chunxiong Wu, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 16/325,495

(22) PCT Filed: May 23, 2017

(86) PCT No.: PCT/CN2017/085559
§ 371 (c)(1),
(2) Date: Feb. 14, 2019

(87) PCT Pub. No.: WO2018/032846
PCT Pub. Date: Feb. 22, 2018

(65) Prior Publication Data
US 2019/0199389 A1    Jun. 27, 2019

(30) Foreign Application Priority Data
Aug. 17, 2016   (CN) .......................... 2016 1 0679846

(51) Int. Cl.
*H04B 1/3888*     (2015.01)
*A45C 11/00*      (2006.01)
(Continued)

(52) U.S. Cl.
CPC ............ *H04B 1/3888* (2013.01); *A45C 11/00* (2013.01); *H01R 13/2421* (2013.01);
(Continued)

(58) Field of Classification Search
CPC . H04B 1/3888; A45C 11/00; A45C 2011/002; A45C 2011/003; H01R 13/2421; G06F 1/181
See application file for complete search history.

(56) References Cited

U.S. PATENT DOCUMENTS

2005/0139498 A1    6/2005  Goros
2016/0018851 A1*   1/2016  Kwon .................. G06F 1/1616
                                                    361/679.28

FOREIGN PATENT DOCUMENTS

CN    103491215    1/2014
CN    103560034    2/2014
(Continued)

*Primary Examiner* — Dinh Nguyen

(57) ABSTRACT

A smart device assembly and a protection case for a smart device are provided. The protection case includes a rear case and a cover plate. A membrane switch is placed in the cover plate, and an outer surface of the cover plate includes a key window arranged corresponding to a key portion in the membrane switch. An extension wire of a lower circuit layer of the membrane switch is extended out from the cover plate. A spring pogo pin connector is arranged on the extension wire of the lower circuit layer of the membrane switch. A slot is formed in the smart device. A pogo pin base connected to a GPIO pin of a processor of the smart device is disposed inside a body of the smart device. A contact point of the pogo pin base is exposed in the slot.

20 Claims, 4 Drawing Sheets

(51) Int. Cl.
*H01R 13/24* (2006.01)
*G06F 1/18* (2006.01)

(52) U.S. Cl.
CPC ... *A45C 2011/002* (2013.01); *A45C 2011/003* (2013.01); *G06F 1/181* (2013.01)

(56) References Cited

FOREIGN PATENT DOCUMENTS

| | | |
|---|---|---|
| CN | 103595874 | 2/2014 |
| CN | 203522828 | 4/2014 |
| CN | 204258877 | 4/2015 |
| CN | 204994139 | 1/2016 |
| CN | 106263411 | 1/2017 |

* cited by examiner

SMART DEVICE ASSEMBLY AND PROTECTION CASE FOR SMART DEVICE

RELATED APPLICATIONS

This application is a National Phase of PCT Patent Application No. PCT/CN2017/085559 having International filing date of May 23, 2017, which claims the benefit of priority of Chinese Patent Application No. 201610679846.1filed on Aug. 17, 2016. The contents of the above applications are all incorporated by reference as if fully set forth herein in their entirety.

FIELD AND BACKGROUND OF THE INVENTION

The present invention relates to a peripheral product for a smart device and in particular, to a protection case for a smart device.

With development of a smart device (e.g. a smart phone, a tablet computer, or other electronic product having a display screen) market, there is an increasing demand for thinner and lighter smart devices having larger screens. However, some problems occur when the aforesaid demand is satisfied. A light and thin smartphone with a large screen has the following problems: a) screens are fragile and easily scratched; b) it is difficult to operate the smartphone with one hand; c) poor heat dissipation. The three problems result in poor customer experiences. In recent years, protection covers for mobile phones appear in the market. Although the protection covers can solve the problem that the smartphones are fragile and scratched easily, a 5-inch or larger screen smartphone needs a user to open its protection cover with both hands, and then the user can press a power button and unlock the screen, so it is troublesome and inconvenience to use the protection cover.

SUMMARY OF THE INVENTION

The present invention provides a smart device assembly and a protection case for a smart device. The present invention has a simple structure that allows a user to operate a smart device with one hand and also protects the smart device at the same time.

According to one aspect of the present invention, the present invention provides a protection case for a smart device. The protection case includes a rear case and a cover plate connected to a side edge of the rear case. A membrane switch is disposed in the cover plate. An outer surface of the cover plate includes a key window disposed corresponding to a key portion in a panel layer of the membrane switch. An extension wire of a lower circuit layer of the membrane switch is extended out from an inside of the cover plate. A spring pogo pin connector is disposed on the extension wire of the lower circuit layer of the membrane switch. A slot is formed in the smart device and is arranged corresponding to the spring pogo pin connector for insertion of a pogo pin of the spring pogo pin connector. A pogo pin base connected to a GPIO (general purpose input/output) pin of a processor of the smart device is disposed in the slot inside a body of the smart device. A contact point of the pogo pin base is exposed in a rear end of the slot.

The key portion of the panel layer of the membrane switch includes buttons labelled numbers 0 to 9, buttons labelled symbols * and #, and a dial-out button.

A screen observation window is disposed in the cover plate.

A transparent protection plate is disposed in the screen observation window.

The cover plate includes a top layer and a bottom layer, the key window is disposed in the top layer, the membrane switch is disposed between the top layer and the bottom layer, the screen observation window is disposed in the top layer and the bottom layer, and a periphery of the protection plate is disposed around the screen observation window and between the top layer and the bottom layer.

The extension wire of the lower circuit layer of the membrane switch is extended from the inside of the cover plate to an edge of the rear case, the spring pogo pin connector is fixed to an edge of the cover plate, the slot is disposed in a side edge of the body of the smart device and arranged corresponding to the spring pogo pin connector, and the pogo pin base is disposed inside the body of the smart device and arranged corresponding to the slot.

The extension wire of the lower circuit layer of the membrane switch is extended from the inside of the cover plate to an inner surface of the rear case, the spring pogo pin connector is fixed to the inner surface of the rear case, the slot is disposed on a rear shell of the smart device and arranged corresponding to the spring pogo pin connector, and the pogo pin base is disposed inside the body of the smart device and arranged corresponding to the slot.

According to another aspect of the present invention, the present invention provides a smart device assembly. The smart device assembly includes a smart device and the foregoing protection case for the smart device. The rear case fits and is connected to a rear surface of the smart device.

A rim of the smart device is in close contact with a peripheral edge of the rear case, and the peripheral edge of the rear case extends upward.

The smart device is connected to the rear case through a magnetic structure.

Compared to conventional techniques, the present invention has the following advantage. By using the membrane switch in the cover plate, the spring pogo pin connector is connected to the pogo pin base in a rear surface of the smart device. Accordingly, the membrane switch is connected to the smart device, and a user can operate the buttons with one hand without the need to open the cover plate. The present invention has a simple structure, enables quick and easy operations, and is especially suitable for the smart device with a 5-inch or larger screen.

BRIEF DESCRIPTION OF THE SEVERAL VIEWS OF THE DRAWINGS

FIG. 1-1 is a cross-sectional view showing a cover plate of the present invention;

DETAILED DESCRIPTION OF SPECIFIC EMBODIMENTS OF THE INVENTION

Detailed descriptions of the present disclosure and embodiments thereof are illustrated below in conjunction with the accompanying drawings.

Figure 1:
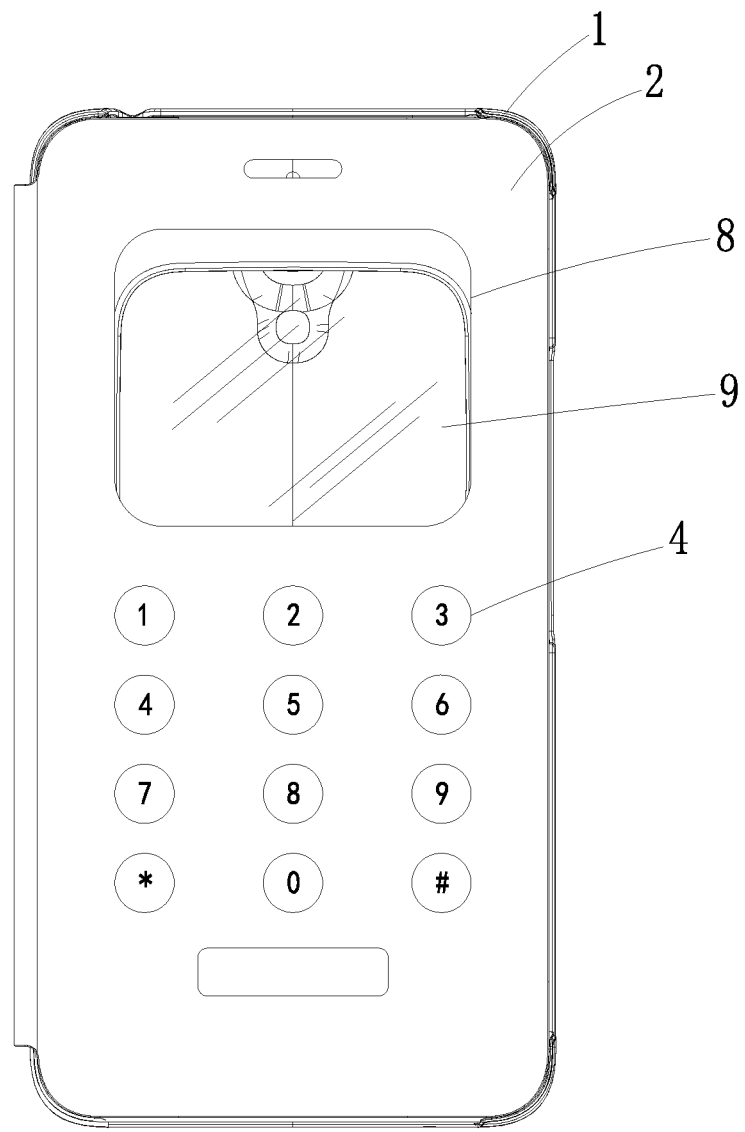
FIG. 1 is a schematic view showing an outer structure of the present invention.
Figure 1:
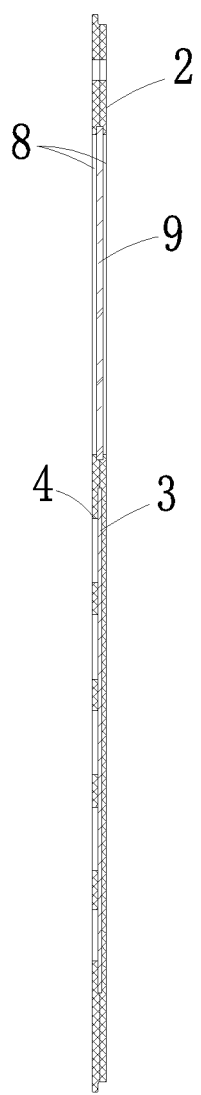
Figure 2:
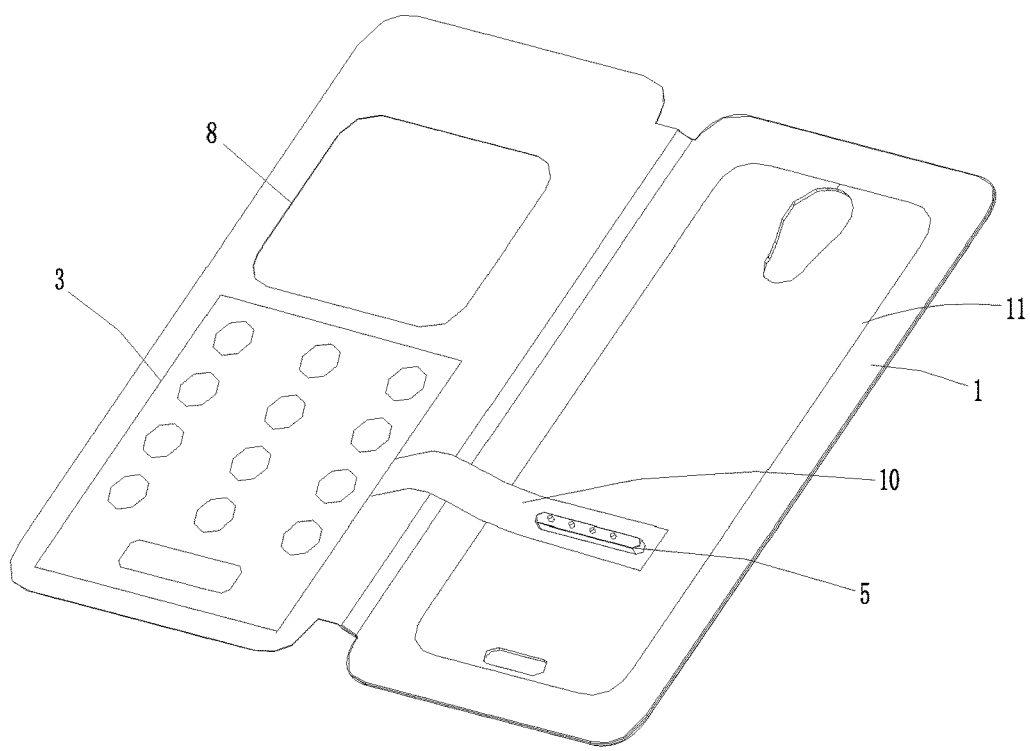
FIG. 2 is a schematic view showing an inner structure of a protection cover according to a first embodiment of the present invention.
Figure 3:
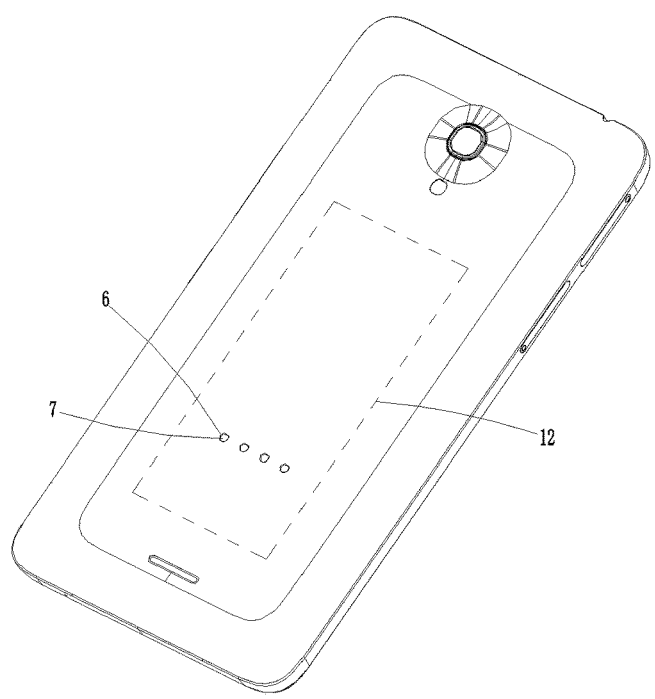
FIG. 3 is a schematic view showing a location of a pogo pin base according to the first embodiment of the present invention.

Please refer to FIGS. 1, 1-1, 2, and 3, showing a protection case for a smart device according to the present invention. The protection case for the smart device includes a rear case 1 and a cover plate 2 connected to a side edge of the rear case 1. The cover plate 2 includes a top layer and a bottom layer. A membrane switch 3 is disposed between the top layer and the bottom layer of the cover plate 2. A top layer of the cover plate 2 includes a key window 4 disposed corresponding to a key portion in a panel layer of the membrane switch 3, and an extension wire 10 of a lower circuit layer of the membrane switch 3 which is extended out from a place between the top layer and the bottom layer of the cover plate 2. A spring pogo pin connector 5 is disposed on the extension wire 10 of the lower circuit layer of the membrane switch 3. A slot 6 is formed in the smart device and is arranged corresponding to the spring pogo pin connector 5 for insertion of a pogo pin of the spring pogo pin connector 5. The number of the slots 6 is the same as the number of the pogo pins of the spring pogo pin connector 5. A pogo pin base 7 connected to a GPIO (general purpose input/output) pin of a processor of the smart device is disposed in the slot 6 inside a body of the smart device. A contact point of the pogo pin base 7 is exposed in a rear end of the slot 6. A screen observation window 8 extending through the top layer and the bottom layer is defined in the cover plate 2. A transparent protection plate 9 is disposed in the screen observation window 8. A periphery of the protection plate 9 is disposed around the screen observation window 8 between the top layer and the bottom layer of the cover plate 2. The protection plate 9 is fixed to the cover plate 2 by adhesion. The key portion of the panel layer of the membrane switch 3 includes buttons labelled numbers 0 to 9, buttons labelled symbols * and #, and a dial-out button. A layout of the buttons (i.e. the buttons 0 to 9, the buttons * and #, and the dial-out button) of the key portion is the same as a layout of buttons of commonly-used mobile phones in the market.

Figure 4:
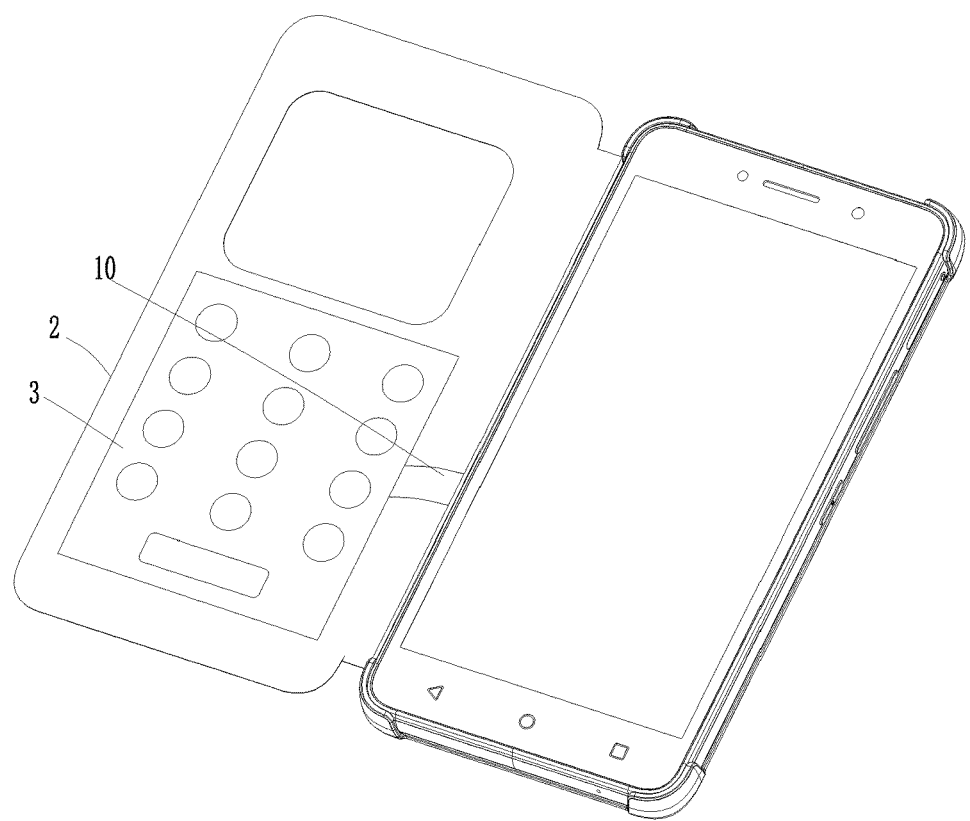
FIG. 4 is a schematic view showing that the protection cover is assembled to a smart device according to the first embodiment of the present invention.

As shown in FIGS. 3 and 4, in the first embodiment of the present invention, the extension wire 10 of the lower circuit layer of the membrane switch 3 is extended to an inner surface (a surface facing the smart device) of the rear case 1. The spring pogo pin connector 5 is fixed to the inner surface of the rear case 1, the slot 6 is defined in a rear shell of the smart device and arranged corresponding to the spring pogo pin connector 5, and the pogo pin base 7 is disposed inside the body of the smart device and arranged corresponding to the slot 6.

Figure 5:
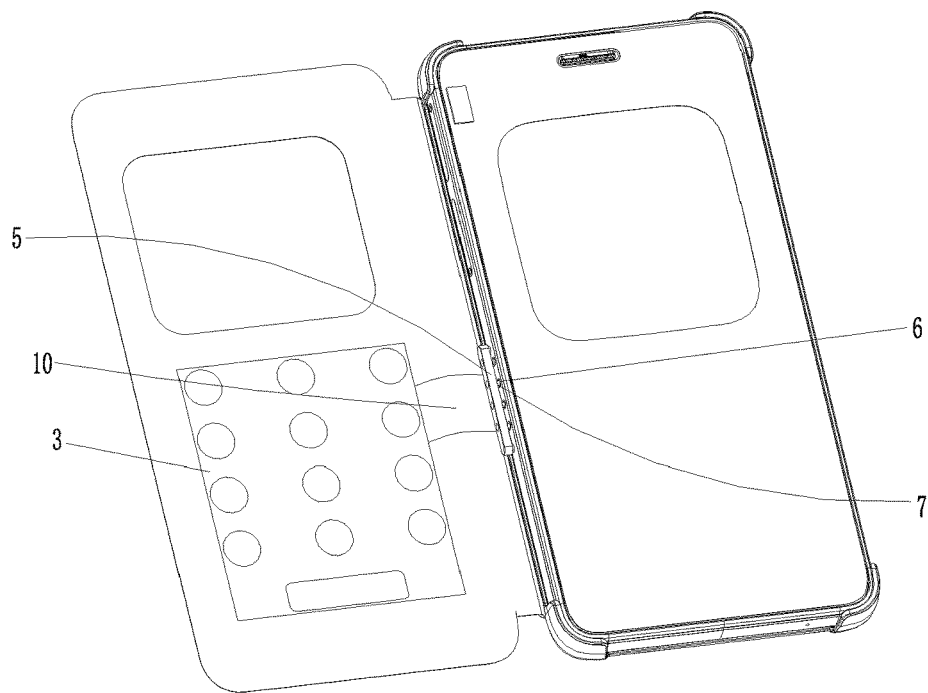
FIG. 5 is a schematic view showing that the protection cover is assembled to the smart device according to a second embodiment of the present invention.

Referring to FIG. 5, in the second embodiment of the present invention, the extension wire 10 of the lower circuit layer of the membrane switch 3 is extended between the top layer and the bottom layer of the cover plate 2 to an edge of the rear case 1, the spring pogo pin connector 5 is fixed to an edge of the cover plate 2, the slot 6 is defined in a side edge of the body of the smart device and arranged corresponding to the spring pogo pin connector 5, and the pogo pin base 7 is disposed inside the body of the smart device and arranged corresponding to the slot 6.

Referring to FIG. 4, the present invention provides a smart device assembly. The smart device assembly includes a smart device and the aforesaid protection cover for the smart device. The rear case 1 of the protection cover for the smart device fits and is connected to a rear surface of the smart device.

A rim of the smart device is in close contact with a peripheral edge of the rear case, and the peripheral edge of the rear case extends upward. Alternatively, the smart device is connected to the rear case through a magnetic structure. The magnetic structure is detailed as follows. As shown in FIGS. 2 and 3, a first magnet 11 is disposed on the rear case 1, and a second magnet 12 of opposite polarity to the first magnet 11 is disposed in the smart device or on a rear shell of the smart device. By using the first magnet 11 and the second magnet 12 magnetically attracted to each other, the smart device is quickly connected to the protection case for the smart device.

The present invention has the following advantage. While protecting the smart device, the present invention allows a user to operate the smart device with one hand without the need to open the cover plate. Therefore, the smart device with a large screen can be operated easily without troubles/problems.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A protection case for a smart device, comprising:
 a rear case; and
 a cover plate connected to a side edge of the rear case, wherein a membrane switch is disposed in the cover plate, an outer surface of the cover plate includes a key window disposed corresponding to a key portion in a panel layer of the membrane switch, an extension wire of a lower circuit layer of the membrane switch is extended out from an inside of the cover plate, a spring pogo pin connector is disposed on the extension wire of the lower circuit layer of the membrane switch, a slot is formed in the smart device and is arranged corresponding to the spring pogo pin connector for insertion of a pogo pin of the spring pogo pin connector, a pogo pin base connected to a GPIO (general purpose input/output) pin of a processor of the smart device is disposed in the slot inside a body of the smart device, and a contact point of the pogo pin base is exposed in a rear end of the slot;
 wherein the extension wire of the lower circuit layer of the membrane switch is extended from the inside of the cover plate to the side edge of the rear case, the spring pogo pin connector is fixed to an edge of the cover plate, the slot is disposed in a side edge of the body of the smart device and arranged corresponding to the spring pogo pin connector, and the pogo pin base is disposed inside the body of the smart device and arranged corresponding to the slot.

2. The protection case for the smart device according to claim 1, wherein the key portion of the panel layer of the membrane switch includes buttons labelled numbers 0 to 9, buttons labelled symbols * and #, and a dial-out button.

3. The protection case for the smart device according to claim 1, wherein a screen observation window is disposed in the cover plate.

4. The protection case for the smart device according to claim 3, wherein a transparent protection plate is disposed in the screen observation window.

5. The protection case for the smart device according to claim 4, wherein the cover plate includes a top layer and a bottom layer, the key window is disposed in the top layer, the membrane switch is disposed between the top layer and the bottom layer, the screen observation window is disposed in the top layer and the bottom layer, and a periphery of the protection plate is disposed around the screen observation window and between the top layer and the bottom layer.

6. A protection case for a smart device, comprising
a rear case; and
a cover plate connected to a side edge of the rear case, wherein a membrane switch is disposed in the cover plate, an outer surface of the cover plate includes a key window disposed corresponding to a key portion in a panel layer of the membrane switch, an extension wire of a lower circuit layer of the membrane switch is extended out from an inside of the cover plate, a spring pogo pin connector is disposed on the extension wire of the lower circuit layer of the membrane switch, a slot is formed in the smart device and arranged corresponding to the spring pogo pin connector for insertion of a pogo pin of the spring pogo pin connector, a pogo pin base connected to a GPIO (general purpose input/output) pin of a processor of the smart device is disposed in the slot inside a body of the smart device, and a contact point of the pogo pin base is exposed in a rear end of the slot.

7. The protection case for the smart device according to claim 6, wherein the extension wire of the lower circuit layer of the membrane switch is extended from the inside of the cover plate to an inner surface of the rear case, the spring pogo pin connector is fixed to the inner surface of the rear case, the slot is disposed in a rear shell of the smart device and arranged corresponding to the spring pogo pin connector, and the pogo pin base is disposed inside the body of the smart device and arranged corresponding to the slot.

8. The protection case for the smart device according to claim 7, wherein the key portion of the panel layer of the membrane switch includes buttons labelled numbers 0 to 9, buttons labelled symbols * and #, and a dial-out button.

9. The protection case for the smart device according to claim 7, wherein a screen observation window is disposed in the cover plate.

10. The protection case for the smart device according to claim 9, wherein a transparent protection plate is disposed in the screen observation window.

11. The protection case for the smart device according to claim 10, wherein the cover plate includes a top layer and a bottom layer, the key window is disposed in the top layer, the membrane switch is disposed between the top layer and the bottom layer, the screen observation window is disposed in the top layer and the bottom layer, and a periphery of the protection plate is disposed around the screen observation window and between the top layer and the bottom layer.

12. A smart device assembly, comprising:
a smart device; and
a protection case for the smart device, wherein the protection case for the smart device includes a rear case and a cover plate connected to a side edge of the rear case, a membrane switch is disposed in the cover plate, an outer surface of the cover plate includes a key window disposed corresponding to a key portion in a panel layer of the membrane switch, an extension wire of a lower circuit layer of the membrane switch is extended out from an inside of the cover plate, a spring pogo pin connector is disposed on the extension wire of the lower circuit layer of the membrane switch, a slot is formed in the smart device and arranged corresponding to the spring pogo pin connector for insertion of a pogo pin of the spring pogo pin connector, a pogo pin base connected to a GIPO pin of a processor of the smart device is disposed in the slot inside a body of the smart device, a contact point of the pogo pin base is exposed in a rear end of the slot, and the rear case fits and is connected to a rear surface of the smart device.

13. The smart device assembly according to claim 12, wherein a rim of the smart device is in close contact with a peripheral edge of the rear case, and the peripheral edge of the rear case extends upward.

14. The smart device assembly according to claim 12, wherein the smart device is connected to the rear case through a magnetic structure.

15. The smart device assembly according to claim 12, wherein the extension wire of the lower circuit layer of the membrane switch is extended from the inside of the cover plate to an edge of the rear case, the spring pogo pin connector is fixed to the edge of the cover plate, the slot is disposed in a side edge of the body of the smart device and arranged corresponding to the spring pogo pin connector, and the pogo pin base is disposed inside the body of the smart device and arranged corresponding to the slot.

16. The smart device assembly according to claim 12, wherein the extension wire of the lower circuit layer of the membrane switch is extended from the inside of the cover plate to an inner surface of the rear case, the spring pogo pin connector is fixed to the inner surface of the rear case, the slot is disposed on a rear shell of the smart device and arranged corresponding to the spring pogo pin connector, and the pogo pin base is disposed inside the body of the smart device and arranged corresponding to the slot.

17. The smart device assembly according to claim 12, wherein the key portion of the panel layer of the membrane switch includes buttons labelled numbers 0 to 9, buttons labelled symbols * and #, and a dial-out button.

18. The smart device assembly according to claim 12, wherein a screen observation window is disposed in the cover plate.

19. The smart device assembly according to claim 18, wherein a transparent protection plate is disposed in the screen observation window.

20. The smart device assembly according to claim 19, wherein the cover plate includes a top layer and a bottom layer, the key window is disposed in the top layer, the membrane switch is disposed between the top layer and the bottom layer, the screen observation window is disposed in the top layer and the bottom layer, and a periphery of the protection plate is disposed around the screen observation window and between the top layer and the bottom layer.

* * * * *